Dec. 1, 1931.  D. FERRELL ET AL  1,834,581
SEAL CONSTRUCTION
Filed Aug. 30, 1926  2 Sheets-Sheet 2
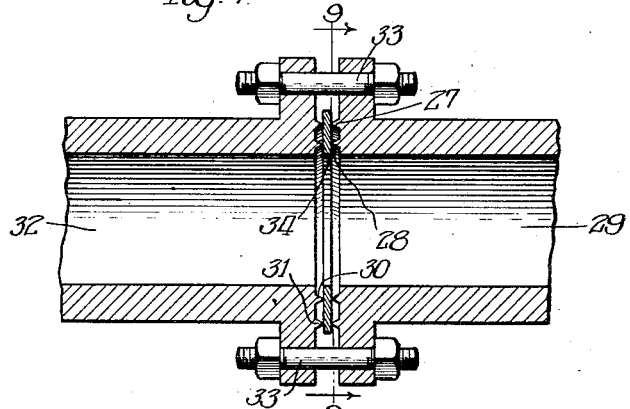
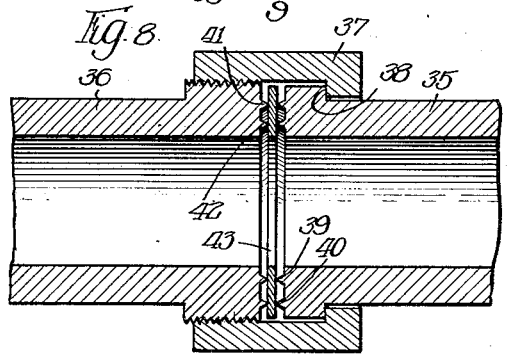
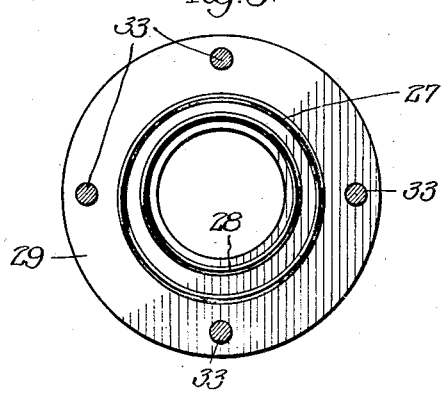
Inventors:
Dent Ferrell,
Arthur W. Helmholtz,
By Wilkinson, Huxley, Byron & Knight
attys
Witness:
R. Burkhardt Patented Dec. 1, 1931

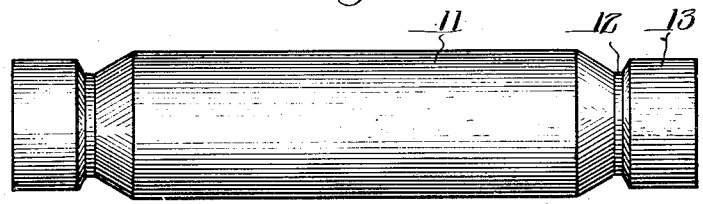
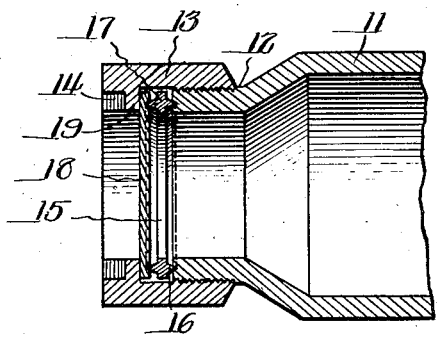
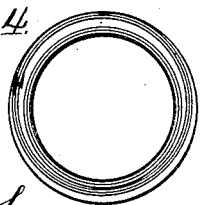
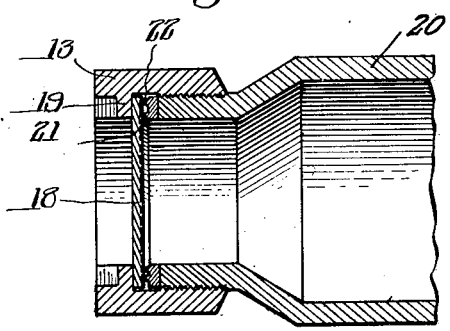
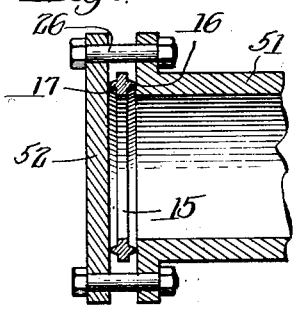
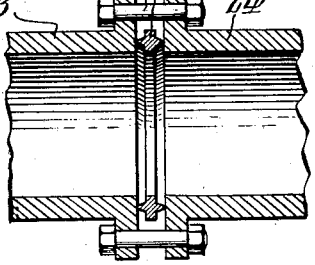

1,834,581

UNITED STATES PATENT OFFICE

DENT FERRELL AND ARTHUR W. HELMHOLTZ, OF HARRISBURG, ILLINOIS, ASSIGNORS TO SAFETY MINING COMPANY, OF HARRISBURG, ILLINOIS, A CORPORATION OF ILLINOIS

SEAL CONSTRUCTION

Application filed August 30, 1926. Serial No. 132,472.

This invention relates to a new and improved seal construction and more particularly to a metal seal adapted to withstand very high pressures.

In the production and handling of liquefied gas and in other similar industries it is necessary to handle these gases and liquids under very high pressures which reach several thousand pounds per square inch. Ordinary types of packing formed of fabric, rubber, asbestos and similar materials are incapable of holding gases and liquids under such pressures, and, moreover, rapidly deteriorate in such use.

It is an object of the present invention to provide a seal construction consisting only of metal and adapted to withstand high pressures.

It is an additional object to provide an efficient all metal seal for common and high pressure pipe joints especially superior to existing joints for carrying hot gases and liquids and high pressure gases and liquids.

It is also an object to provide a seal construction which may be manufactured at relatively low cost, and which is simple in design and requires no special tools for its production or use.

It is a further object to provide a seal which may be closed by a rotary movement of certain of the parts without rotation of the interfitting sealing elements.

Other and further objects will appear as the description proceeds.

We have illustrated certain preferred embodiments of our invention in the accompanying drawings, in which Figure 1 is a side elevation of a form of container adapted to hold gases or fluids under high pressures, its ends being sealed by our construction;

Figure 2 is a longitudinal section through one end of Figure 1, showing one form of construction;

Figure 3 is a view similar to Figure 2 showing a modified form of construction;

Figure 4 is a face view of the knife edge rings of Figure 3;

Figure 5 is a fragmentary section showing a modified form adapted for use with cylinder heads;

Figure 6 is a similar view showing a further modification adapted for use as a pipe coupling;

Figure 7 is a fragmentary section showing a modified form of pipe coupling;

Figure 8 is a fragmentary section showing a form of threaded pipe coupling; and

Figure 9 is a section taken on line 9—9 of Figure 7.

Referring now to the drawings—

Figure 1 shows a cylinder 11 having reduced end portions 12 closed by the sleeves 13 which are threaded in place, as best shown in Figure 2. This cylinder is adapted to hold gas under pressure and may be made from rolled or drawn steel or similar material. The end of the sleeve 13 is formed with the notches 14 adapted to receive a suitable wrench for screwing the sleeve into place and removing it as desired. The sealing ring 15 is provided on its opposite faces with the hard metal knife edges 16 and 17. The edge 16 engages the end face of the cylinder 11, the metal of which is softer than that of the knife edge. The sealing disc 18 is forced against the knife edge 17 by the shoulder 19 on the sleeve 13. The disc 18 is formed of material softer than the knife edge 17.

In the form of construction shown in Figure 3, the cylinder 20, similar in form to the cylinder 11, is provided on its end with a pair of continuous knife edges 21 and 22. As best shown in Figure 4, these knife edges are not concentric but are so placed as to have varying distances between them at different points upon their circumference. The sealing disc 18 is forced against the knife edges 21 and 22 by the shoulder 19 of the sleeve 13, these latter parts being identical with those shown in Figure 2.

Another use of the construction is shown in Figure 5, in which a sealing ring 15, with knife edges 16 and 17, identical with that of Figure 2, is used to seal the joint between the end of the cylinder 51 and the cylinder head 52, which are drawn together by bolts 26. In Figure 6 the sealing ring 15 is used to seal the joint between two pipe sections 23 and 24 which are secured together by bolts 25.

In the form of construction shown in Figures 7 and 9, the knife edges 27 and 28 are formed on pipe 29 and similar knife edges 30 and 31 are formed on pipe 32. The pipes are drawn together by bolts 33, which forces the knife edges into the sealing ring 34 which is formed of metal softer than the knife edges. The coupling of Figure 8 is similar to that of Figure 7 with the exception that in this form the pipes 35 and 36 are drawn together by rotating sleeve 37 which is threaded on pipe 36 and engages the shoulder 38 of pipe 35. The knife edges 39 and 40 may be eccentrically related and the knife edges 41 and 42 similarly formed. The softer sealing ring 43 is clamped between the opposed knife edges.

In the form of construction shown in Figure 2, the seal is made by placing the ring 15 against the end of the cylinder and then threading on the sleeve 13 which carries loosely with it the disc 18 fitting against the shoulder 19. The knife edges, which are preferably of hardened steel, bite into the cylinder end and disc and form a gas tight metal seal. It will be understood that the cross section of the knife edges may be varied depending upon the metals used, and also upon the pressure which must be withstood. Less sharp knife edges will require greater power in sealing to force them into the metal, but when so sealed will withstand greater pressures.

In the form of construction shown in Figures 3 and 4, the knife edges 21 and 22 are of hardened steel which may be made by special treatment of the ends of the cylinder 20, or may be made separately and welded upon the cylinder end. With the form of construction shown in Figure 2, the rotation of the sleeve 13 tends to rotate the sealing disc 18, due to the frictional engagement of the shoulder 19. This movement of the disc has been found undesirable in securing a perfect seal at very high pressures. The construction of Figure 3 prevents this rotation. Eccentrically placed knife edges 21 and 22 both bite into the disc 18 and prevent its rotation. The seal, by these double knife edges so constructed, is therefore, the most efficient for high pressure use.

In Figures 5 and 6 we have shown other uses of the sealing ring 15 and further uses will be obvious to those skilled in the art. In the sealing of cylinder heads or pipe connections, as shown, the parts are not rotated but are drawn together directly by the bolts. Consequently, the double eccentric rings are not normally required.

It is to be understood in connection with this invention that an unusual advantage is realized in that rotation is prevented between the sealing means and the parts between which it is clamped, this being true irrespective of the form of our invention as shown in the various figures of the drawings. This result is accomplished by means of the two double knife edges which are located eccentrically to each other, which prevents the knife edges from rotating after they have once been forced into engagement with the soft metal part adjacent thereto. It is obvious that this is true, whether the knife edges be on opposite sides of the sealing ring, as shown in Figures 2, 5 and 6, or whether they be both on the same member, as shown in Figures 3, 7, 8 and 9. The eccentrical relationship is clearly shown in Figure 9. This is particularly advantageous when the parts between which the sealing ring is clamped are brought together by relative rotation, but it is likewise serviceable in applications where the two parts are brought together in a straight line as by means of bolts or other clamping means, as shown in Figures 7 and 8, in that it prevents subsequent rotation of the ring where there might be a tendency toward such rotation.

While we have shown certain preferred forms and uses of our invention in the accompanying drawings, we contemplate such further changes and modifications as come within the spirit and scope of the appended claims.

We claim:

1. A seal joint comprising a pair of members adapted to be drawn together by means tending to produce relative rotation thereof and means for sealing the joint between said members comprising a knife edge sealing ring eccentric to the axis of said members.

2. A seal joint comprising spaced members and an interposed sealing member, means for drawing said spaced members together tending to produce relative rotation thereof and an eccentrically disposed knife edge ring on one of said members.

3. A seal joint comprising an open end tubular member, a sealing member adapted to close the open end of said tubular member, means having rotative adjustment with said tubular member and adapted to engage said sealing member for drawing the two said members together and an eccentrically disposed knife edge ring on one of said members adapted to bite into the other said member.

4. A seal joint comprising an open end tubular member, a sealing member adapted to close the open end of said tubular member, means having rotative adjustment with said tubular member and adapted to engage said sealing member for drawing the two said members together with a plurality of knife edge rings on one of said members adapted to bite into the other said member, said rings being eccentric with respect to said members.

5. A seal joint comprising an open end tubular member, a sealing member adapted to close the open end of said tubular member, means having rotative adjustment with said tubular member and adapted to engage said sealing member for drawing the two said members together and a plurality of knife edge rings on one of said members adapted to bite into the other said member, said rings being eccentric with respect to each other and to said members.

6. A seal joint comprising a tubular member having an open end, a disc adapted to close said end, a sleeve threaded on said member and having an inwardly extending flange adapted to engage and clamp said disc against the end of said member, and an eccentric sealing ring on said member adapted to engage said disc.

Signed at Harrisburg, Illinois, this 26th day of August, 1926.

DENT FERRELL.
A. W. HELMHOLTZ.